United States Patent Office 2,927,137
Patented Mar. 1, 1960

2,927,137

PROCESS FOR OXIDATION OF MERCAPTANS TO DISULFIDES

Garbis H. Meguerian, Park Forest, Ill., assignor to Standard Oil Company, Chicago, Ill., a corporation of Indiana No Drawing. Application September 22, 1954
Serial No. 457,773

7 Claims. (Cl. 260—608)

This invention relates to the oxidation of mercaptans to the corresponding disulfides. More particularly the invention relates to the regeneration of fat aqueous caustic solutions containing mercaptides.

It is common to remove mercaptans from hydrocarbon oils by extracting the mercaptans with a solvent. The solvent may be an aqueous caustic solution or, more commonly, an aqueous caustic solution containing a solutizer. This solutizer may be a phenolic compound such as cresol or xylenol, or it may be an oil-insoluble alcohol such as methanol. The oil reduced in mercaptan content is separated from a fat solution comprising solvent and mercaptans, normally present as mercaptides. Economics require regeneration of the fat solution by removal of the mercaptans. Most commonly the mercaptans are eliminated by conversion to the corresponding disulfides through oxidation with free oxygen in the presence of a catalyst. The disulfides may be separated by decantation or extracted with a hydrocarbon oil.

The most common mercaptan oxidation catalysts are the polyhydroxybenzenes, most commonly hydroquinone and gallic acid. Hydroquinone, para-di-hydroxybenzene, is most commonly used because of its cheapness and relative efficiency. Even when using hydroquinone oxidation catalyst, the conversion of mercaptans to disulfides with free oxygen is a relatively slow operation.

An object of this invention is a process for the oxidation of mercaptans to disulfides utilizing hydroquinone as a catalyst. Another object is a more rapid mercaptan oxidation process than is possible with hydroquinone catalyst alone. Still another object is an improved process for regenerating fat aqueous caustic mercaptide solution with free oxygen in the presence of hydroquinone catalyst. A further object is a process for sweetening sour oils by contacting said oil with aqueous caustic solution in the presence of hydroquinone mercaptan oxidation catalyst. Other objects will become apparent in the course of the detailed description.

In the process of the invention, a mercaptan is converted to disulfide by contacting said mercaptan with free oxygen in the presence of aqueous caustic solution, which aqueous caustic solution contains a catalytically effective amount of hydroquinone and a catalytically effective amount of an iron salt that is appreciably soluble in water.

It has been discovered that the oxidation of mercaptans to disulfides by free oxygen and aqueous caustic solution is greatly increased by utilizing as the catalyst both hydroquinone and an iron salt which is soluble in water. A catalytically effective amount of iron must be present in the solution. In general, between about 0.003 and about 0.5 weight percent of iron in the form of a water soluble iron salt is utilized, based on mercaptan solution charged to the mercaptan conversion zone. The preferred salts are ferric chloride, ferric sulfate, ferric nitrate, and ferric acetate. Either the anhydrous form or the hydrated form may be utilized.

The polyhydroxybenzene catalyst utilized in the process may be either hydroquinone itself or a substituted hydroquinone which is soluble in aqueous caustic solution. Examples of the substituted hydroquinones are 2-methyl-hydroquinone, 2-chlorohydroquinone, 2-t-butylhydroquinone, and 2-ethoxyhydroquinone. At least an amount of hydroquinone that is effective to catalyze the oxidation of mercaptans, in the absence of the iron salt, is utilized. This catalytically effective amount may be determined by reference to the voluminous teachings of the art. However, usually the amount of hydroquinone is between about 0.001 and 1 weight percent, based on the mercaptan containing solution charged to the mercaptan oxidation zone.

The process is applicable to the conversion of a pure mercaptan or a mixture of mercaptans or to mercaptans which are dissolved in solvents therefor. For example sour benzol, sour naphtha, sour kerosene, and alcohol solutions. It is necessary to have present in the mercaptan conversion zone an aqueous caustic solution, for example sodium hydroxide or potassium hydroxide. The amount of aqueous caustic solution, the concentration thereof and the mode of contacting of the aqueous caustic solution and the mercaptan or mercaptan-containing solution is well known to this art and need not be described herein in detail.

The conversion of the mercaptan is carried out at a temperature between about 60° F. and about 130° F. Preferably the contacting is carried out at about 100° F.

It is well known that when using a polyhydroxybenzene oxidation catalyst, the mercaptan present in the conversion zone cannot be completely converted without destroying the polyhydroxybenzene catalyst. In order to avoid excessive loss of catalyst, only a portion of the mercaptan present is converted per pass and the remainder is recycled to the mercaptan enriching zone. In general, in a commercial process wherein a sour petroleum distillate is contacted with lean aqueous caustic solution and the fat solution is regenerated, only about one-half of the mercaptan content of the fat solution is oxidized in the regeneration zone. In addition to loss of the hydroquinone as the conversion of mercaptan proceeds, the rate at which the conversion proceeds decreases. At the beginning of the contacting, the rate is at a maximum and as the mercaptan is converted, the rate of conversion decreases. This decrease in rate of conversion is believed to be the result of destruction of the catalyst itself. Therefore, the degree of conversion of the mercaptan is held to a level of about 50% not only to minimize loss of polyhydroxybenzene catalyst, but also to avoid excessively long times of residence in the conversion zone.

Sufficient free oxygen must be provided in the mercaptan conversion zone to convert the mercaptan to disulfides, to the extent of conversion desired. Owing to the side reaction with the catalyst itself, when very high conversion is desired such as 90%, an excess of free oxygen over the theoretical requirement must be employed. It is to be understood that the type of contacting and the temperature and pressure maintained in the conversion zone also play a part in the amount of free oxygen required, i.e., free oxygen may pass through the conversion zone without participating in the reaction owing to inadequate agitation.

By using as the mercaptan oxidation catalyst hydroquinone and a water soluble iron salt, it is possible to greatly increase the rate of mercaptan conversion at the start of the reaction and to maintain an increased rate such that the length of time needed to reach the desired degree of conversion is greatly reduced as compared to operation with hydroquinone alone. Furthermore, the presence of the iron salt does not have any deleterious effect on the degree of oxidation of the hydroquinone itself. Therefore operations utilizing hydroquinone as the mercaptan oxidation catalyst now known to the art may be operated utilizing the iron salt catalytic promoter of this invention with no change except in the length of time devoted to the conversion reaction.

One mode of utilizing the process: Pure methyl mercaptan is absorbed in aqueous castic solution containing about 8% of sodium hydroxide. The aqueous caustic solution contains, for example, 0.005 weight percent of hydroquinone (para-di-hydroxybenzene) and 0.05 weight percent of iron obtained by adding ferric chloride-hexahydrate to the solution. The mercaptan containing solution is contacted with cylinder oxygen at a temperature of 90° F. for a time of about 5 minutes, which is sufficient to convert 50% of the methyl mercaptan to dimethyldisulfide. The dimethyldisulfide is readily separated from the aqueous caustic-mercaptide solution by decantation. The lean solution is then recycled to the methyl mercaptan absorption zone.

In another mode of utilizing the process, a sour heater oil boiling between about 340° F. and 575° F. is contacted with a solution containing 100 volumes of 40% aqueous KOH solution, 30 volumes of methanol, and 15 volumes of petroleum phenols boiling about the xylenol range. A fat solution is separated from a distillate substantially reduced in mercaptan content. The fat solution which contains as mercaptan oxidation catalyst about 0.05 weight percent of hydroquinone and about 0.05 weight percent of iron is contacted with free oxygen at a temperature of about 80° F. for a time sufficient to reduce the mercaptan content to about 50%. The disulfides are then extracted with a sweet heavy naphtha to obtain a regenerated solution.

In another mode of operation, an aqueous caustic solution containing about 0.1 weight percent of hydroquinone and about 0.1 weight percent of iron and petroleum cresols is utilized to contact a sour naphtha at a temperature of about 100° F. in the presence of about 150% of the theoretical requirement of free oxygen to convert all the mercaptan in the sour naphtha. Under these conditions, hydroquinone is oxidized and lost from the aqueous caustic solution. However, a sweet naphtha product is obtained in a contacting time considerably shorter than is obtainable with a process utilizing hydroquinone alone. Also in the case of particularly refractory naphthas, a sweet product is obtainable which is not obtainable with hydroquinone alone.

The results obtainable with the process of the invention are illustrated below. In these examples, a measured amount of mercaptan solution and caustic were added to a 50 ml. round bottomed flask. The necessary amount of hydroquinone (para-di-hydroxybenzene) and/or ferric ion was also added. A few glass beads were present in the flask to aid in agitation. The flask was clamped to an arm in such a way that the contents were immersed in a constant temperature bath set at 88° F. Oxygen was introduced into the top of the flask above the surface of the liquid at a pressure of 1 atmosphere. This pressure was maintained by adding oxygen to the flask at the same rate that oxygen was absorbed by the solution; the rate of oxygen absorption was measured. The contents of the flask were agitated in order to improve the oxygen-liquid contacting by shaking the flask at 250 vibrations per minute.

In all the examples, the fat solution contained 5 volume percent of hexyl mercaptan dissolved in 94% aqueous methanol; the alkali metal hydroxide was sodium hydroxide. The iron was introduced into the solution by dissolving the desired amount of ferric chloride hexahydrate therein. The hydroquinone was CP quality. In each example, 17 ml. of total solution was used.

EXAMPLE 1

In this example, several runs were made to determine the relative effectiveness of hydroquinone, ferric chloride, and a combination of these two in catalyzing the conversion of hexyl mercaptan to the corresponding disulfide.

The aqueous methanol contained 0.4 weight percent of NaOH. Run A was carried out using 0.0027 weight percent of hydroquinone and no iron. Run B was carried out using 0.0125 weight percent of iron (0.06 weight percent $FeCl_3.6H_2O$) and no hydroquinone. The time needed to convert 75% of the hexyl mercaptan was determined. The results of these runs are set out in Table I.

*Table I*

| Run | Hydroquinone, wt. percent | Iron, wt. percent | Minutes for 75% Conversion of RSH |
|---|---|---|---|
| A | 0.0027 | None | 123 |
| B | None | a 0.0125 | 352 |
| C | 0.0027 | a 0.0125 | 27 |
| D | 0.0027 | b 0.0625 | 5 | a 0.06 wt. percent $FeCl_3.6H_2O$.
b 0.30 wt. percent $FeCl_3.6H_2O$.

Run A shows that 2 hours were needed under these conditions to convert 75% of the mercaptan using hydroquinone as the catalyst. Run B shows that almost 6 hours were needed when using iron salt in the absence of hydroquinone. Run C, wherein the same amount of hydroquinone and ferric chloride were used together as were present in runs A and B, respectively, shows the startling decrease in conversion time of 1.5 hours or just about a 75% reduction in time needed for 75% conversion as compared with hydroquinone alone in run A. In run D, the amount of iron present was increased by five-fold and the time needed to obtain 75% conversion was decreased by roughly five-fold as compared with run C. This example shows that it is possible to eliminate more than 90% of the time needed when utilizing hydroquinone alone as mercaptan oxidation catalyst.

EXAMPLE 2

In this example, the influence of aqueous caustic concentration on the rate of mercaptan conversion was observed. The rate of conversion was determined in this example by plotting the milliliters of oxygen absorbed during the conversion per minute. A plot was made of the oxygen absorbed against time of contacting and the rate of oxygen absorption determined at various mercaptan contents. The maximum oxygen absorption occurs at the start of the reaction. As the conversion proceeds, the rate decreases sharply. In this example, the mercaptan conversion is given at the point at which the rate of oxygen absorption had decreased to only 20% of the maximum rate. In runs E, F, G and H, the catalyst was hydroquinone alone in an amount of 0.0027 weight percent, based on mercaptan-containing solution charged to the flask. In run I, both hydroquinone and iron obtained from ferric chloride were present. In this example, runs were made with different amounts of sodium hydroxide present in the flask. (The concentration of NaOH based on water present in each run was: Runs E and I, 6.8%; run F, 8.5%; run G, 10.2%; and run H, 12.2%.) The results of these runs are shown in Table II.

*Table II*

| Run | NaOH Present, wt. percent | Maximum Oxygen Absorption, ml./minutes | Total RSH Converted when $O_2$ Rate was 20% of the Maximum |
|---|---|---|---|
| E a | 0.4 | 0.22 | 96.8 |
| F a | 0.5 | 0.54 | 84.4 |
| G a | 0.6 | 0.95 | 76.5 |
| H a | 0.72 | 1.34 | 73.3 |
| I b | 0.4 | 1.02 | 96.3 | a 0.0027 wt. percent hydroquinone.
b 0.0027 wt. percent hydroquinone and 0.0125 wt. percent iron.

Runs E through H show that increasing the concentration of caustic very favorably improves the maximum oxygen absorption rate; thus about doubling the caustic concentration increases the maximum rate about 6 times. However, increasing the caustic concentration had a decided adverse effect on the total rate of conversion. Thus, in run E, the conversion was substantially complete when the rate had dropped to 20% of the maximum, whereas in run H, about one-quarter of the mercaptan was still unconverted when the rate had dropped to 20% of the maximum. It is believed that this decided deleterious effect of increasing the caustic concentration is the result of increased rate of hydroquinone oxidation. Run I shows that the extremely favorable effect of iron on the rate of oxidation absorption has no deleterious effect on the rate of hydroquinone oxidation. Runs E and I were identical except for the presence of iron in run I. In both of these runs, within the experimental error, the total mercaptan conversion was the same when the rate of oxygen absorption was only 20% of the maximum rate. This example shows that not only should the iron salt catalyst promoter of the invention be utilized, but also the aqueous caustic solution should be maintained at a very low concentration, on the order of about 4 to 8% or lower, as determined by absorptive capacity for mercaptans.

Thus having described the invention, what is claimed is:

1. A process which comprises contacting a sour petroleum distillate with an aqueous caustic solution containing between about 4% and 8% caustic, and between about 0.001 and 1 weight percent of hydroquinone and between about 0.003 and 0.5 weight percent of iron in the form of a water-soluble iron salt to obtain a distillate phase substantially reduced in mercaptan content and a fat solution comprising aqueous caustic and mercaptans, contacting said fat solution at a temperature between about 60° F. and about 130° F. with free oxygen in an amount sufficient to substantially decrease the mercaptan content of said fat solution but insufficient to oxidize a substantial amount of hydroquinone, separating disulfides formed by oxidation of mercaptans from a lean solution comprising aqueous caustic and unconverted mercaptans and recycling said lean solution to the sour distillate contacting zone.

2. A mercaptan oxidation process comprising contacting a mercaptan with an aqueous caustic solution containing an amount of hydroquinone and of an iron salt, which is appreciably soluble in water, sufficient to catalyze the oxidation of mercaptan to disulfide, in the presence of free-oxygen, said process being characterized by a mercaptan oxidation rate synergistically faster than obtainable with either hydroquinone or said salt alone, when used in the same amount as used in the two-catalyst process.

3. The process of claim 2 wherein said salt is ferric chloride.

4. The process of claim 2 wherein said salt is ferric sulfate.

5. The process of claim 2 wherein said salt is ferric nitrate.

6. The process of claim 2 wherein said salt is ferric acetate.

7. The process of claim 2 wherein said aqueous caustic solution contains between about 4 and 8 weight percent of caustic.

References Cited in the file of this patent

UNITED STATES PATENTS

| | | |
|---|---|---|
| 2,457,635 | Bond et al. | Dec. 28, 1948 |
| 2,583,083 | Bond et al. | Jan. 22, 1952 |
| 2,593,761 | Johnstone | Apr. 22, 1952 |
| 2,651,595 | Moulthrop | Sept. 8, 1953 |